United States Patent
Abe

(10) Patent No.: US 10,262,625 B2
(45) Date of Patent: Apr. 16, 2019

(54) DISPLAY DEVICE AND DISPLAY METHOD

(71) Applicant: ABE Masatoshi, Tokyo (JP)

(72) Inventor: Masatoshi Abe, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 195 days.

(21) Appl. No.: 14/772,922

(22) PCT Filed: Mar. 4, 2013

(86) PCT No.: PCT/JP2013/055834
§ 371 (c)(1),
(2) Date: Sep. 4, 2015

(87) PCT Pub. No.: WO2014/136176
PCT Pub. Date: Sep. 12, 2014

(65) Prior Publication Data
US 2016/0005378 A1    Jan. 7, 2016

(51) Int. Cl.
*H04N 5/268* (2006.01)
*G09G 5/00* (2006.01)
*G06F 3/14* (2006.01)

(52) U.S. Cl.
CPC ............ *G09G 5/006* (2013.01); *G06F 3/14* (2013.01); *G09G 5/003* (2013.01);
(Continued)

(58) Field of Classification Search
CPC .. H04N 5/50; H04N 5/44; H04N 7/16; H04N 5/268; G09G 5/006; G09G 5/003;
(Continued)

(56) References Cited

U.S. PATENT DOCUMENTS 6,678,005 B2 * 1/2004 Anderson .......... H04N 5/44513
348/473
7,636,931 B2 * 12/2009 Gatto .................. H04N 5/76
725/131
(Continued)

FOREIGN PATENT DOCUMENTS

JP    H07-181910 A    7/1995
JP    2000-330537 A   11/2000
(Continued)

OTHER PUBLICATIONS

International Search Report (ISR) (PCT Form PCT/ISA/210), in PCT/JP2013/055834, dated May 21, 2013.

*Primary Examiner* — Trang U Tran
(74) *Attorney, Agent, or Firm* — McGinn I.P. Law Group, PLLC.

(57) ABSTRACT

A display device includes: a first detection unit that detects an external signal from a second external device via a second connection unit, and outputs a first detection result indicating presence of an external signal; and a control unit that determines whether the second external device is connected with a second input unit based on the first detection result, and performs control so that a video signal to be supplied to a display unit is switched from a first video signal to a second video signal to cause the display unit to display an image based on the second video signal in a case where the control unit that determines that the second external device is connected with the second input unit.

19 Claims, 8 Drawing Sheets

(52) U.S. Cl.
CPC ..... *G09G 2370/04* (2013.01); *G09G 2370/20* (2013.01); *G09G 2370/22* (2013.01); *G09G 2370/24* (2013.01)

(58) Field of Classification Search
CPC ........... G09G 2370/04; G09G 2370/20; G09G 2370/22; G09G 2370/24; G06F 3/14
USPC ................................ 348/705, 725, 552–555
See application file for complete search history.

(56) References Cited

U.S. PATENT DOCUMENTS

| | | | | |
|---|---|---|---|---|
| 7,934,246 | B2* | 4/2011 | Iwahashi | H04N 5/44543 725/151 |
| 8,228,439 | B2* | 7/2012 | Takagi | H04N 5/4401 348/725 |
| 8,595,766 | B2* | 11/2013 | Ahn | H04N 5/445 348/14.03 |
| 2007/0241990 | A1* | 10/2007 | Smith | G09G 5/003 345/5 |
| 2012/0295662 | A1* | 11/2012 | Haubrich | H04M 1/72533 455/556.1 |

FOREIGN PATENT DOCUMENTS

| | | |
|---|---|---|
| JP | 2001-255861 A | 9/2001 |
| JP | 2005-218002 A | 8/2005 |
| JP | 2006-285167 A | 10/2006 |
| JP | 2009-258202 A | 11/2009 |
| JP | 2011-180331 A | 9/2011 |

\* cited by examiner

DISPLAY DEVICE AND DISPLAY METHOD

TECHNICAL FIELD

The present invention relates to a display device and a display method.

BACKGROUND ART

There is a display device that has a plurality of video input terminals. In this type of display device, a video input terminal is not directly selected on an operation button of the remote controller or the main body by the user. Instead, all of video input terminals provided on the display device are sequentially switched each time the input switching switch is pressed.

In a display device that sequentially switches all video input terminals provided on the display device each time the input switching switch is pressed, there are problems described below. For users who do not have signal connections to all of the input terminals, switching to even input terminals that do not receive signal input will also occur when the switching switch is pressed in order to switch inputs. Consequently, in this type of display device, the input switching switch is pressed more than necessary, and the operation is cumbersome.

For this reason, Patent Document 1 proposes, when there is no signal to a video input terminal, to automatically skip the video input terminal.

Moreover, Patent Document 2 proposes to set video input terminals that are not used by user.

PRIOR ART DOCUMENTS

Patent Documents

[Patent Document 1] Japanese Unexamined Patent Application, First Publication No. 2001-255861
[Patent Document 2] Japanese Unexamined Patent Application, First Publication No. 2005-218002

SUMMARY OF THE INVENTION

Problem to be Solved by the Invention

However, in the technique disclosed in Patent Document 1, input cannot be switched when a signal is not being input to a video input terminal. Therefore, it is not possible to change adjustment items that cannot be set unless switched to the video input terminal. Moreover, in the case where a connected PC (personal computer) is in a power saving mode, signal output from the PC is not made. Therefore, switching cannot be performed.

Furthermore, in the technique disclosed in Patent Document 2, if a video signal is input in error to a video input terminal not in use that has been set by the user, the video signal cannot be displayed. Therefore the user needs to make an effort to switch the setting. Moreover if the user is unable to confirm this, a claim may be made against the manufacturer of the display device in some cases.

An exemplary aspect of the present invention takes into consideration the above problems, with an object of providing a display device and a display method capable of displaying video signals according to the video signal input to the video input terminal.

Means for Solving the Problem

In order to achieve the above object, a display device according to an exemplary aspect of the present invention includes: a plurality of input units to which video signals from an external device are input respectively; a plurality of connection units that are associated respectively with the input units to which the external device is connected; a switching unit that switches video signals input to the plurality of input units; a first detection unit that detects presence of a signal from a device connected to the plurality of connection units; and a control unit that performs control so that a video signal is switched and displayed on a display unit according to a switching signal output from the switching unit, based on a first detection result detected by the first detection unit, in a case where the external device is connected to the input unit.

In order to achieve the above object, a display method according to an exemplary aspect of the present invention includes: a switching step of switching video signals input to a plurality of input units; a first detection step of detecting presence of signals from devices connected to a plurality of connection units; and a control unit that performs control so that the video signals are switched and displayed on a display unit according to a switching signal output in the switching step, based on a first detection result detected in the first detection step, in a case where an external device is connected to an input unit of a plurality of input units, to which video signals from the external device are input respectively.

Effect of the Invention

According to an exemplary aspect of the present invention, the display device is capable of displaying video signals according to the video signal input to the video input terminal.

EMBODIMENTS FOR CARRYING OUT THE INVENTION

First Exemplary Embodiment

Figure 1:
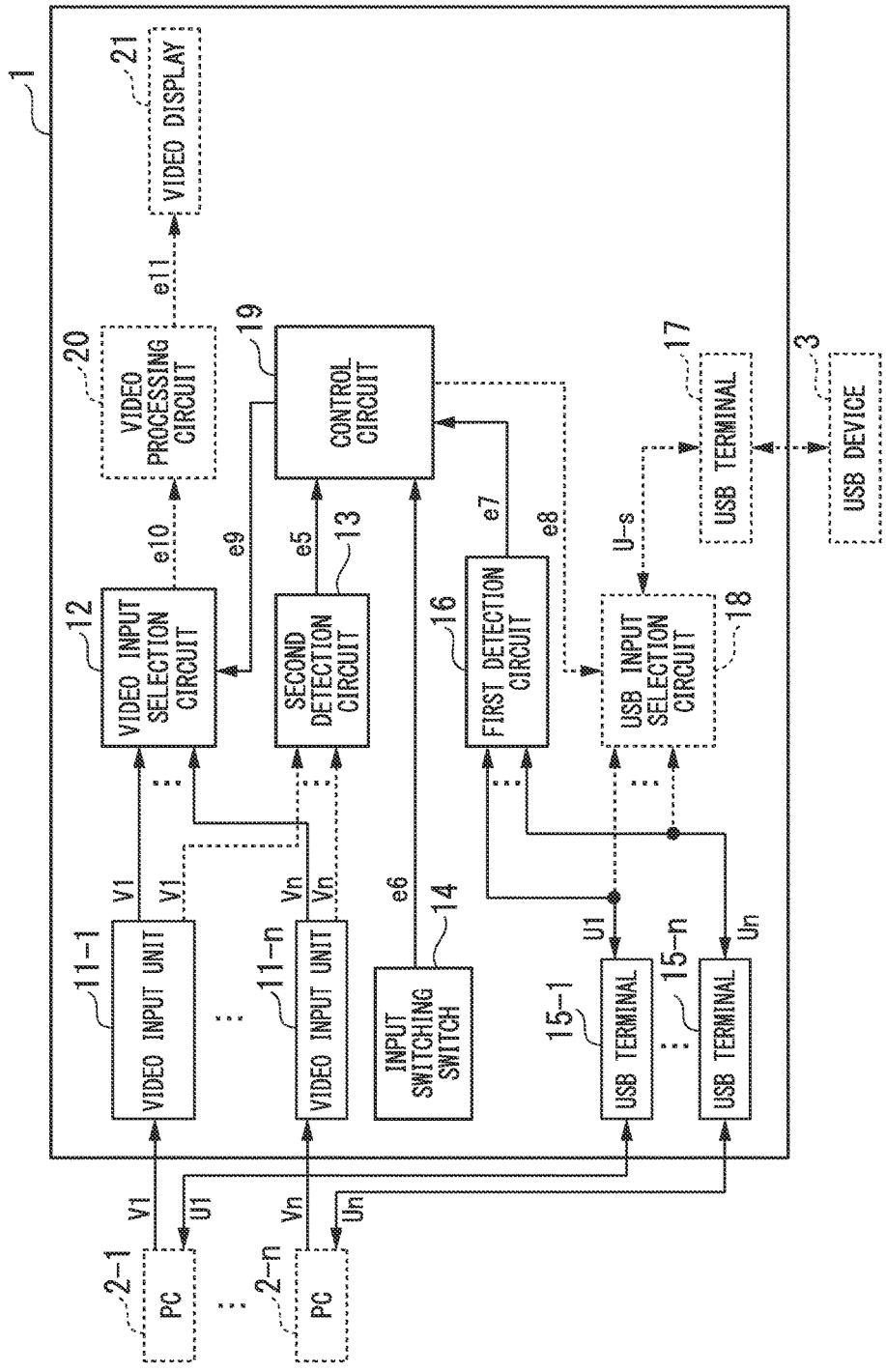
FIG. 1 is a block diagram of a schematic configuration of a display device according to a first exemplary embodiment.

FIG. 1 is a block diagram of a schematic configuration of a display device 1 according to the present exemplary embodiment. As shown in FIG. 1, the display device 1 includes: n (n is an integer not less than 2) video input units 11-1 to 11-$n$; a video input selection circuit 12; a second detection circuit 13; an input switching switch 14; n USB (universal serial bus) terminals 15-1 to 15-n; a first detection circuit 16; a USB terminal 17; a USB input selection circuit 18; a control circuit 19; a video processing circuit 20; and a video display unit 21.

Moreover, as shown in FIG. 1, to the display device 1 there are connected PCs (personal computers) 2-1 to 2-n, and a USB device 3. Examples of the USB device 3 include a keyboard and a mouse. Furthermore, as shown in FIG. 1, the PC 2-1 outputs a video signal V1 to the video input unit 11-1, and outputs a USB signal U1 to the USB terminal 15-1. The PC 2-n outputs a video signal V1 to the video input unit 11-n, and outputs a USB signal U2 to the USB terminal 15-n. If none of the video input units 11-1 to 11-n is specified, it is simply referred to as video input unit 11. If none of the USB terminals 15-1 to 15-n is specified, it is simply referred to as USB terminal 15. If none of the PCs 2-1 to 2-n is specified, it is simply referred to as PC 2. Moreover, in the present exemplary embodiment, the video input unit 11 and the USB terminal 15 are associated with each other on a one-to-one basis. That is to say, the video input unit 11-1 is associated with the USB terminal 15-1, ... , the video input unit 11-n is associated with the USB terminal 15-n.

The video input unit 11-1 outputs a video signal V1 input from the PC 2-1, to the video input selection circuit 12 and the second detection circuit 13. The video input unit 11-n outputs a video signal Vn input from the PC 2-n, to the video input selection circuit 12 and the second detection circuit 13. The video input units 11-1 to 11-n include for example video input terminals. Moreover, in the case where the input video signal is an analog signal, the video input units 11-1 to 11-n may convert the analog signal to a digital signal and output the video signal that has been converted to a digital signal, to the video input selection circuit 12.

Based on a video selection signal e9 output from the control circuit 19, the video input selection circuit 12 selects one video signal from video signals V1 to Vn input to the video input units 11-1 to 11-n. The video input selection circuit 12 outputs the selected video signal e10 to the video processing circuit 20.

The second detection circuit 13 detects the presence of a signal output from the video input units 11-1 to 11-n. For example, if the signal output from the video input unit 11-1 contains a video signal, the second detection circuit 13 detects that the PC 2-1 is connected to the video input unit 11-1. Alternatively, if the signal output from the video input unit 11-1 contains a synchronization signal (horizontal synchronization signal or vertical synchronization signal), the second detection circuit 13 detects that the PC 2-1 is connected to the video input unit 11-1. The second detection circuit 13 outputs to the control circuit 19, a signal e5 that indicates the presence of a signal for each video input unit 11.

The input switching switch 14 outputs to the control circuit 19, a video switching request signal e6 that indicates the switch as being pressed.

The USB terminal 15-1 outputs to the first detection circuit 16, a USB signal U1 input from the PC 2-1 connected to the USB terminal 15-1. Moreover, the USB terminal 15-1 outputs to the PC 2-1, a USB signal U-s output from the USB input selection circuit 18. The USB terminal 15-n outputs to the first detection circuit 16, a USB signal Un input from the PC 2-n connected to the USB terminal 15-n. Moreover, the USB terminal 15-n outputs to the PC 2-n, a USB signal U-s output from the USB input selection circuit 18. In the present exemplary embodiment, a USB signal from the PC 2 to the display device 1 is referred to as downstream, and a USB signal from the display device 1 to the PC 2 is referred to as upstream.

The first detection circuit 16 uses signals output from the USB terminals 15-1 to 15-n to detect USB signals U1 to Un. For example, in the case where the power supply line of a signal output from the USB terminal is +5V, the first detection circuit 16 detects that a USB cable from the PC 2 is connected to the USB terminal and an USB signal is input. The first detection circuit 16 outputs to the control circuit 19, a signal e7 that indicates a detected USB presence result.

The USB terminal 17 outputs to the USB input selection circuit 18, a USB signal U-s input from the USB device 3 connected to the USB terminal 17.

The USB input selection circuit 18 outputs to any one of the USB terminals 15-1 to 15-n, the USB signal U-s output from the USB terminal 17, according to a USB selection signal e8 output from the control circuit 19.

The control circuit 19 receives input of a signal e5 output from the second detection circuit 13, a video switching request signal e6 output from the input switching switch 14, and a signal e7 output from the first detection circuit 16. For each input of a video switching request signal e6, the control circuit 19 controls the video input selection circuit 12 and the USB input selection circuit 18 so as to switch the video input unit 11 and the USB terminal 15. When switching, the control circuit 19 determines the presence of a signal of the selected video input unit 11 based on the signal 5. Moreover, the control circuit 19 determines the presence of a signal of the USB terminal 15 based on the signal e7. If a signal of the video input unit 11 is present or if a signal of the USB terminal 15 is present, the control circuit 19 generates a USB selection signal e8 and a video selection signal e9 so as to switch the video input unit 11 and the USB terminal 15 from the currently selected terminals to the next terminals, according to the video switching request signal e6. The control circuit 19 outputs the generated USB selection signal e8 to the USB input selection circuit 18, and outputs the video selection signal e9 to the video input selection circuit 12.

For example, in the case where the currently selected terminals are the video input unit 11-1 and the USB terminal 15-1, when the video switching request signal e6 is input, the control circuit 19 determines the presence of a signal of the video input unit 11-2 and the presence of a signal of the USB terminal 15-2, which are the next terminals. If a signal of the video input unit 11-2 is present, or if a signal of the USB terminal 15-2 is present, the control circuit 19 performs control via the video input selection circuit 12 so that the video signal of the video input unit 11-2 is displayed on the video display unit 21, according to the video switching request signal e6. Alternatively, if a signal of the video input unit 11-2 is present, or if a signal of the USB terminal 15-2 is present, the control circuit 19 controls the video input selection circuit 18 so that a USB signal is output to the USB terminal 15-2, according to the video switching request signal e6.

The video processing circuit 20 performs a predetermined signal processing on the video signal e10 output from the video input selection circuit 12, and causes the video display unit 21 to display the post-processing video signal e11. Examples of the predetermined signal processing include a processing according to the resolution and/or synchronization frequency of the video signal input to the video input unit 11.

The video display unit 21 displays the video signal e11 output from the video processing circuit 20. The video display unit 21 is, for example, a liquid crystal panel configured by including a backlight device. The display element installed on the video display unit 21 may be a display element of a type other than the liquid crystal type such as an organic electroluminescence display element, an inorganic electroluminescence display element, a PALC (plasma address liquid crystal), a PDP (plasma display panel), or an FED (field emission display). Moreover, the video display unit 21 may be a projector.

Figure 2:
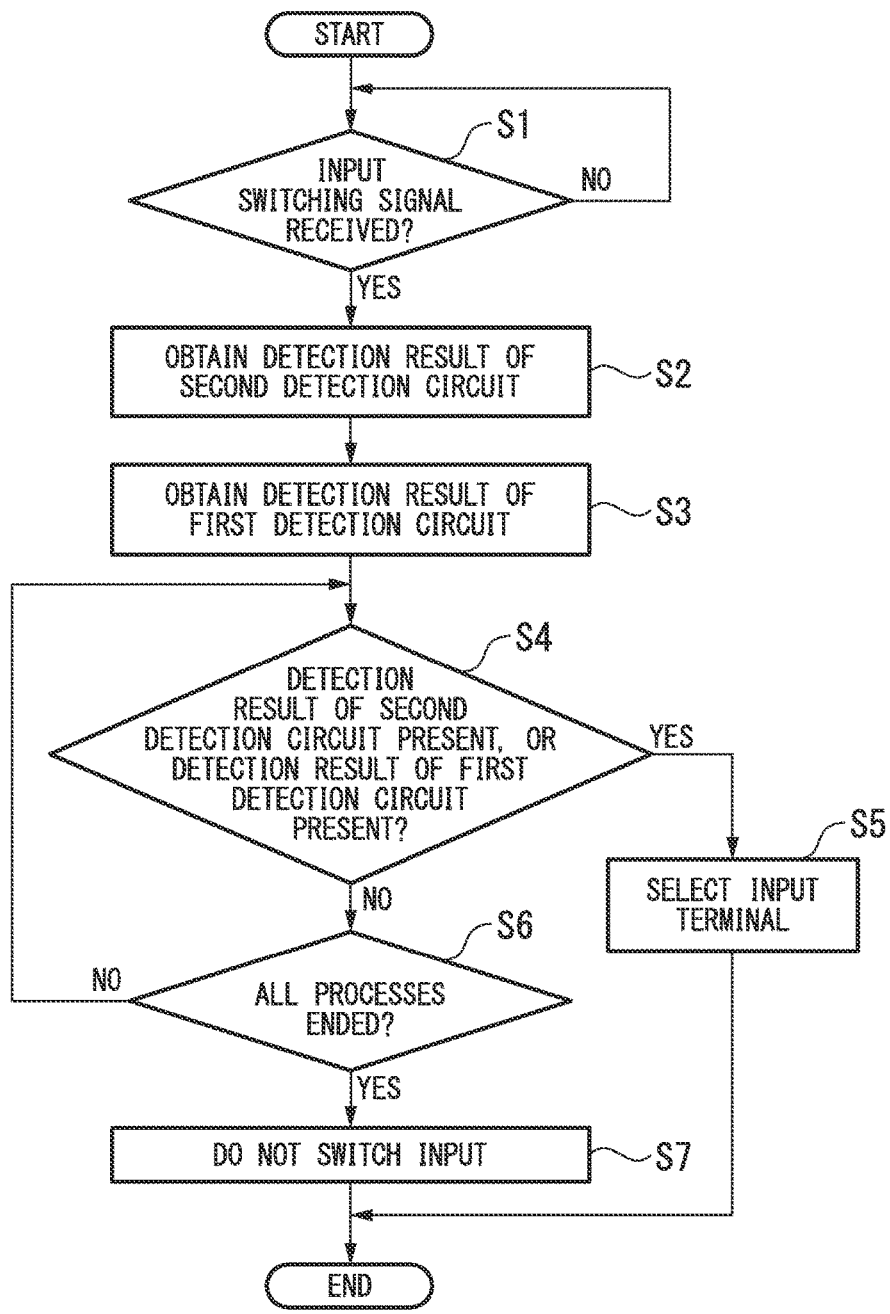
FIG. 2 is a flowchart of processing steps for video signal selection according to the first exemplary embodiment.

FIG. 2 is a flowchart of processing steps for video signal selection according to the present exemplary embodiment.

(Step S1) The control circuit 19 determines whether or not a video switching request signal e6 output from the input switching switch 14 has been detected. If a video switching request signal e6 is determined as being detected (step S1; YES), the control circuit 19 proceeds to step S2, and if a video switching request signal e6 is determined as not being detected (step S1; NO), it repeats step S1.

(Step S2) The control circuit 19 obtains a signal e5 output from the second detection circuit 13.

(Step S3) The control circuit 19 obtains a signal e7 output from the first detection circuit 16.

(Step S4) The control circuit 19 repeats the processes of step S4 through S6 on video signals of the video input units 11-1 to 11-*n*, according to an input switching request signal e6. First, the control circuit 19 determines whether a signal e5 that associates with the next video input unit 11 in the sequence currently displayed on the video display unit 21 is present, or whether or not a signal e7 of the USB terminal 15 that associates with the video input unit 11 is present. The next video input unit 11 in the sequence is the video input unit 11-2 if the video input unit 11-1 is currently selected. If a signal e5 that associates with the next video input unit 11 in the sequence is determined as being present, or if a signal e7 of the USB terminal 15 that associates with the next video input unit 11 in the sequence is determined as being present (step S4; YES), the control circuit 19 causes the process to proceed to step S5. If a signal e5 that associates with the next video input unit 11 in the sequence is determined as being absent, and if a signal e7 of the USB terminal 15 that associates with the next video input unit 11 in the sequence is determined as being absent (step S4; NO), the control circuit 19 causes the process to proceed to step S6.

(Step S5) The control circuit 19 selects the next input video input unit 11 in the sequence as the video input unit to be used. Next, the control circuit 19 generates a video selection signal e9 for outputting, to the video processing circuit 20, the video signal input to the next video input unit 11 in the sequence, and outputs the generated video selection signal e9 to the video input selection circuit 12. Next, the control circuit 19 generates a USB selection signal e8 that is to be output to the USB terminal 15 associated with the next video input unit 11 in the sequence, and outputs the generated USB selection signal e8 to the USB input selection circuit 18. Next, the USB input selection circuit 18 outputs a USB signal U-s output from the USB terminal 17, to the USB terminal 15 associated with the next video input unit 11 in the sequence, according to the USB selection signal e8 output from the control circuit 19. As a result, the upstream and downstream, which are USB signals, are linked to the PC 2 even when the PC 2 is in the power saving mode. Accordingly, the PC 2 is connected to the mouse and the keyboard. Therefore, the PC 2 detects these signals, and automatically resumes from the power saving mode so as to output video signals to the display device 1. Next, the video input selection circuit 12 outputs a video signal e10 of the selected video input unit 11, to the video processing circuit 20, according to the video selection signal e9 output from the control circuit 19.

(Step S6) The control circuit 19 determines whether or not all of the processes for the video input units 11-1 through n have been ended. If all of the process up to the video input unit 11-*n* are determined as having been ended (step S6; YES), the control circuit 19 proceeds to step S7, and if all of the process up to the video input unit 11-*n* are determined as not having been ended (step S6; NO), it returns to step S4.

If all of the process up to the video input unit 11-*n* are determined as not having been ended, the control circuit 19 selects the video input unit 11 of the next processing target, and repeats steps S4 through S6.

(Step S7) Since the requirement is not met for switching to the input terminal other than the one that is currently displayed, the control circuit 19 generates a video selection signal e9 indicating that the video input unit 11 is not to be switched, and outputs the generated video selection signal e9 to the video input selection circuit 12. That is to say, the control circuit 19 does not perform input switching.

Figure 3:
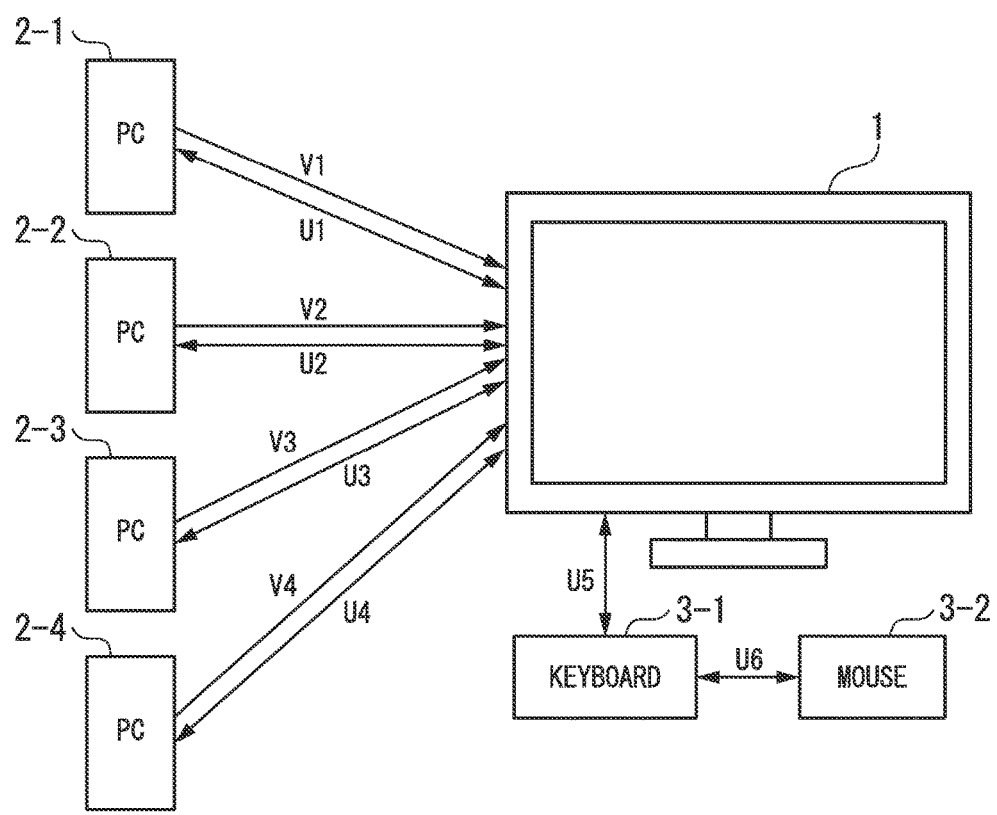
FIG. 3 is a diagram for describing connections between the display device according to the first exemplary embodiment, PCs, and USB devices.

Next, as an example, here is described, using FIG. 1 and FIG. 3, a case where the display device 1 includes four video input units 11-1 to 11-4 and USB terminals 15-1 to 15-4.

FIG. 3 is a diagram for describing connections between the display device 1 according to the present exemplary embodiment, PCs 2, and USB devices. As shown in FIG. 3, to the display device 1 there are connected PCs 2-1 to 2-4, a keyboard 3-1, and a mouse 3-2. A video signal V1 of the PC 2-1 is input to the video input unit 11-1 via a cable. A USB signal U1 of the PC 2-1 is input to the USB terminal 15-1 via a cable.

Hereafter, in a similar manner, a video signal Vn of the PC 2-*n* (n is an integer from 2 to 4) is input to the video input unit 11-*n* via a cable. A USB signal Un of the PC 2-*n* is input to the USB terminal 15-*n* via a cable. Moreover, a USB signal U5 of the keyboard 3-1 is input to the USB terminal 17 via a cable, and a USB signal U6 of the mouse 3-2 is input to the USB terminal 15-1 via the keyboard 3-1 that has a hub function.

Also, the PC 2-1 and the PC 2-2 are supposed to be in the state of the normal operating mode, and the PC 2-3 and the PC 2-4 are supposed to be in the state of the power saving mode.

First, the video display unit 21 of the display device 1 is displaying a video image based on the video signal V1 that is output from the video input unit 11-1 and is input from the PC 2-1.

When the user presses the input switching switch 14, the control circuit 19 determines the presence of a video signal V2 based on the signal e5, or the presence of a USB signal U2 based on the signal e7, for the next video input unit 11-2 in the sequence. Since the PC 2-2 is in the state of the normal operating mode, the control circuit 19 determines a video signal V2 as being present based on the signal e5, and determines a USB signal U2 as being present based on the signal e7. Next, according to the determination results, the control circuit 19 generates a video selection signal e9 that selects the video input unit 11-2, and outputs the generated video selection signal e9 to the video input selection circuit 12.

Next, the control circuit 19 generates a USB selection signal e8 for outputting, to the USB terminal 15-2, the USB signal U-s output from the USB terminal 17, and outputs the generated USB selection signal e8 to the USB input selection circuit 18. Next, the USB input selection circuit 18 outputs the USB signal U-s output from the USB terminal 17, to the USB terminal 15-2, according to the USB selection signal e8 output from the control circuit 19. Next, the video input selection circuit 12 outputs a video signal e10, which is the video signal V2 output from the selected video input unit 11-2, to the video processing circuit 20, according to the video selection signal e9 output from the control circuit 19. The video processing circuit 20 displays the signal e11 based on the video signal V2 on the video display unit 21. As a result, the user can use it in the state where the PC 2-2 is connected to the display device 1, and the keyboard 3-1 and the mouse 3-2 are connected to the PC 2-2.

Next, when the user presses the input switching switch 14, the control circuit 19 determines the presence of a video signal V3 based on the signal e5, or the presence of a USB signal U3 based on the signal e7, for the next video input unit 11-3 in the sequence. Since the PC 2-3 is in the state of the power saving mode, the control circuit 19 determines a video signal V2 as being absent based on the signal e5, and determines a USB signal U2 as being present based on the signal e7. Next, according to the determination results, the control circuit 19 generates a video selection signal e9 for selecting the video input unit 11-3, and outputs the generated video selection signal e9 to the video input selection circuit 12. Next, the control circuit 19 generates a USB selection signal e8 for outputting, to the USB terminal 15-3, the USB signal U-s output from the USB terminal 17, and outputs the generated USB selection signal e8 to the USB input selection circuit 18.

Next, the USB input selection circuit 18 outputs, to the USB terminal 15-3, the USB signal U-s output from the USB terminal 17 according to the USB selection signal e8 output from the control circuit 19. Next, the upstream and downstream, which are USB signals, are linked to the PC 2-3. Accordingly, the PC 2-3, the keyboard 3-1, and the mouse 3-2 are connected. Therefore, the PC 2-3 detects these signals, and automatically resumes from the power saving mode, to output video signals to the display device 1. Next, the video input selection circuit 12 outputs a video signal e10, which is the video signal V3 output from the selected video input unit 11-3, to the video processing circuit 20, according to the video selection signal e9 output from the control circuit 19. The video processing circuit 20 displays the signal e11 based on the video signal V3 on the video display unit 21. As a result, the user can use it in the state where the PC 2-3 is connected to the display device 1, and the keyboard 3-1 and the mouse 3-2 are connected to the PC 2-3.

Next, when the user presses the input switching switch 14, the control circuit 19 determines the presence of a video signal V4 based on the signal e5, or the presence of a USB signal U4 based on the signal e7, for the next video input unit 11-4 in the sequence. In this case, as with the video input unit 11-3, the PC 2-4 is in the state of the power saving mode, and therefore, a process similar to that of the video input unit 11-3 described above is performed. As a result, the user can use it in the state where the PC 2-4 is connected to the display device 1, and the keyboard 3-1 and the mouse 3-2 are connected to the PC 2-4.

Moreover, for example, here is described a case where three PCs 2-1 to 2-3 are connected to the display device 1 in FIG. 3.

When the user presses the input switching switch 14 after the video of the PC 2-3 is selected, the control circuit 19 determines the presence of a video signal V4 based on the signal e5, or the presence of a USB signal U4 based on the signal e7, for the next video input unit 11-4 in the sequence. Since signals are not input to the video input unit 11-4 and the USB terminal 15-4, the control circuit 19 determines a video signal V4 as being absent based on the signal e5, and determines a USB signal U4 as being absent based on the signal e7.

Next, the control circuit 19 determines the presence of a video signal V1 based on the signal e5, or the presence of a USB signal U1 based on the signal e7, for the next video input unit 11-1 in the sequence. Since the PC 2-1 is in the state of the normal operating mode, the control circuit 19 determines a video signal V1 as being present based on the signal e5, and determines a USB signal U1 as being present based on the signal e7. Next, according to the determination results, the control circuit 19 generates a video selection signal e9 for selecting the video input unit 11-1, and outputs the generated video selection signal e9 to the video input selection circuit 12. Next, the control circuit 19 generates a USB selection signal e8 for outputting, to the USB terminal 15-1, the USB signal U-s output from the USB terminal 17, and outputs the generated USB selection signal e8 to the USB input selection circuit 18.

Next, the USB input selection circuit 18 outputs, to the USB terminal 15-1, the USB signal U-s output from the USB terminal 17, according to the USB selection signal e8 output from the control circuit 19. Next, the video input selection circuit 12 outputs a video signal e10, which is the video signal V1 output from the selected video input unit 11-1, to the video processing circuit 20, according to the video selection signal e9 output from the control circuit 19. The video processing circuit 20 displays the signal e11 based on the video signal V1 on the video display unit 21. As a result, the user can use it in the state where the PC 2-1 is connected to the display device 1, and the keyboard 3-1 and the mouse 3-2 are connected to the PC 2-1.

As described above, the display device of the present embodiment includes: a plurality of input units to which video signals from an external device are input respectively; a plurality of connection units that are associated respectively with the input units to which the external device is connected; a switching unit that switches video signals input to the plurality of input units; a first detection unit that detects presence of a signal from a device connected to the plurality of connection units; and a control unit that performs control so that a video signal is switched and displayed on a display unit according to a switching signal output from the switching unit, based on a first detection result detected by the first detection unit, in a case where the external device is connected to the input unit.

With this configuration, the display device 1 according to the present exemplary embodiment detects the presence of a video signal by means of the second detection circuit 13, and detects the presence of a USB signal by means of the first detection circuit 16. Then, in the case where a user request for switching the video input unit 11 is detected, the display device 1 according to the present exemplary embodiment determines whether or not the PC 2 is connected to the video input unit 11 and the USB terminal 15 associated with the request, based on the detection result of the second detection circuit 13 and the detection result of the first detection circuit 16. As a result, the display device 1 according to the present exemplary embodiment can display the video of the connected PC 2 on the video display unit 21. Furthermore, by outputting USB signals of the USB device 3 such as a keyboard and a mouse that is connected to the display device 1, to the USB terminal 15 associated with the PC 2, to which the video signal is input, it is possible to cause the PC 2 in the power saving mode to resume to the normal operating mode.

As a result, the display device 1 according to the present exemplary embodiment can switch video signals and USB signals according to the connected PC 2, and it enables use of a plurality of PCs 2 connected to a single display device 1.

In the present exemplary embodiment, the second detection circuit 13 is described with an example of detecting the presence of a signal to the video input unit 11. However, it is not limited to this. The second detection circuit 13 may detect the ground line potential of the video input unit 11-1 to thereby detect the PC 2-1 being connected to the video input unit 11-1 via a cable. For example, the second detection circuit 13 may detect the PC 2-1 being connected to the video input unit 11-1 via a cable, by connecting a video cable and thereby changing the pulled-up potential from a high level to a low level. Moreover, an example in which there is a single USB 17 has been described in the present exemplary embodiment. However, a USB hub may be placed between the USB input selection circuit 18 and the USB terminal 17, and thereby a plurality of USB terminals may be provided in the display device. As a result, it is possible to connect the mouse 3-2 directly to the display device even if the keyboard 3-1 in FIG. 3 does not have a USB hub function.

Furthermore, in the present exemplary embodiment, the control circuit 19 may switch the video input selection circuit 12 prior to the USB input selection circuit 18, or it may switch the USB input selection circuit 18 prior to the video input selection circuit 12.

Second Exemplary Embodiment

Figure 4:
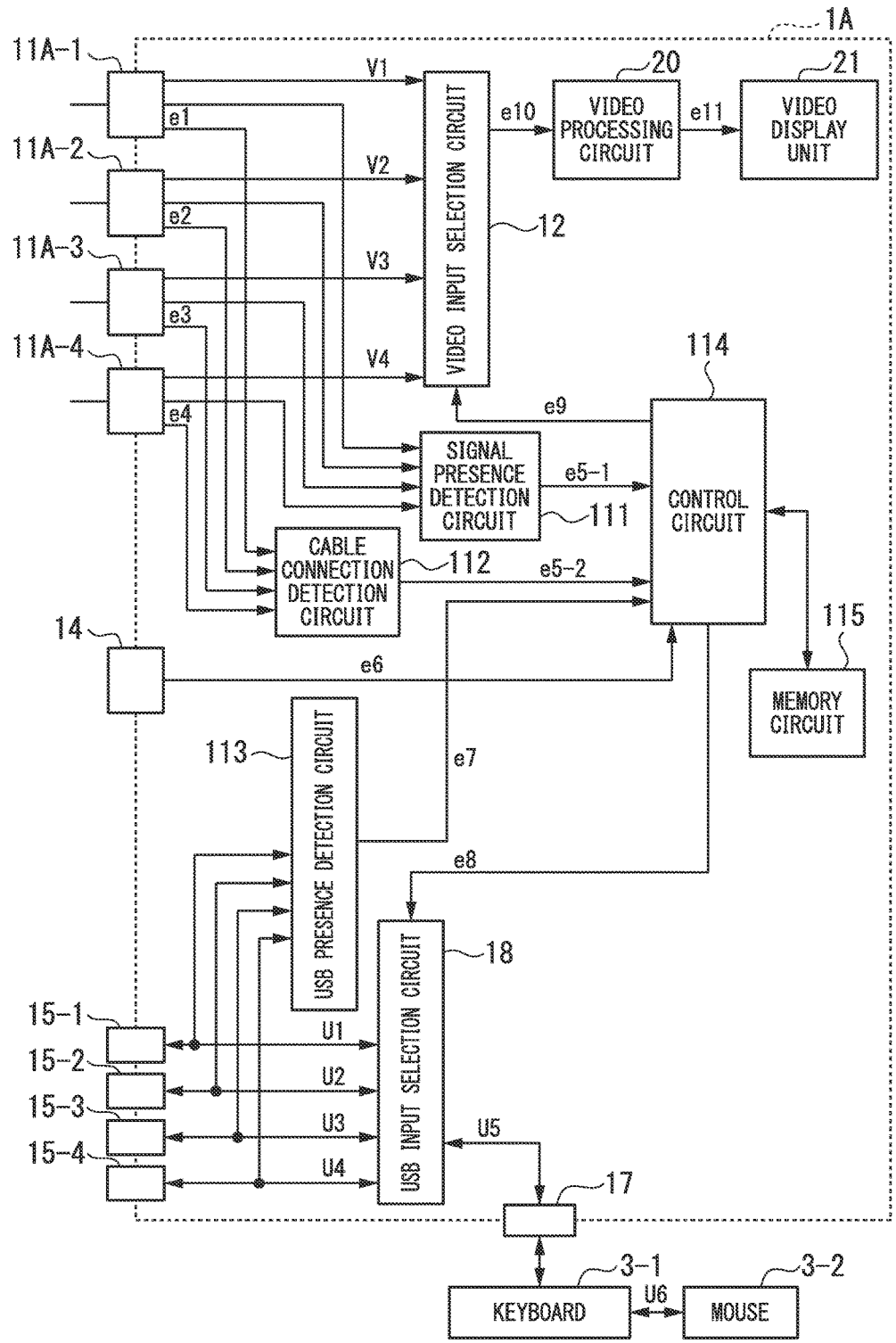
FIG. 4 is a block diagram of a schematic configuration of a display device according to a second exemplary embodiment.

FIG. 4 is a block diagram of a schematic configuration of a display device 1A according to the present exemplary embodiment. As shown in FIG. 4, the display device 1A includes 4 video input units 11A-1 to 11-4, a video input selection circuit 12, a signal presence detection circuit 111, a cable connection detection circuit 112; an input switching switch 14, n USB terminals 15-1 to 15-4, a USB presence detection circuit 113, a USB terminal 17, a USB input selection circuit 18, a control circuit 114, a memory circuit 115, a video processing circuit 20, and a video display unit 21. The functional units having the same functions as those of the display device 1 of the first exemplary embodiment are denoted by the same reference symbols, and descriptions thereof are omitted.

Moreover, as shown in FIG. 4, to the USB terminal 17 there is connected a keyboard 3-1, and a mouse 3-2 is connected thereto via the keyboard 3-1 which has a hub function. A USB signal U5 is output to the USB input selection circuit 18 from the keyboard 3-1, and a USB signal U6 is output to the USB input selection circuit 18 from the mouse 3-2 via the keyboard 3-1 which has a hub function. If none of the video input units 11A-1 to 11-n is specified, it is simply referred to as video input unit 11A.

The signal presence detection circuit 111 detects the presence of video signals V1 to Vn output from the video input units 11A-1 to 11A-4. The signal presence detection circuit 111 outputs to the control circuit 114, a video signal presence detection signal e5-1, which is a detection result indicating the presence of a video signal, for each video input unit 11A. If the video signal input to the video input unit 11A is an analog signal, the signal presence detection circuit 111 detects the presence of a video signal, for example, based on the presence of a HSYNC (horizontal synchronization signal) and a VSYNC (vertical synchronization signal). If the video signal input to the video input unit 11A is a digital signal, the signal presence detection circuit 111 detects the presence of such as a clock signal and DE signal. The DE signal is a data enable signal on the DVI standard.

The cable connection detection circuit 112 detects whether or not the video cable that is connected to the PC 2 is connected to the video input unit 11A. The cable connection detection circuit 112 outputs to the control circuit 114 a cable presence detection signal e5-2, which is a result of the detection. For example, if a ground signal contained in signals e1 to e4 output from the video input units 11A-1 to 11A-4 is detected, the cable connection detection circuit 112 generates, for example, a low level cable presence signal e5-2 by means of an internal circuit. If a ground signal contained in signals e1 to e4 output from the video input units 11A-1 to 11A-4 is not detected, the cable connection detection circuit 112 generates, for example, a high level cable presence signal e5-2 by means of an internal circuit. Here, if the power supply used in the display device 1A is +5V, a low level refers to 0V to 0.8V and a high level refers to 2.4V to 5V for example.

The USB presence detection circuit 113 detects whether or not a USB cable from the PC 2 is connected to the USB terminal 15, based on whether or not the potential of the power supply line signal among the signals contained in the USB signal is +5V. The USB presence detection circuit 113 outputs to the control circuit 114, a USB signal presence detection signal e7, which is a result of the detection. For example, if the potential of the power supply line signal is +5V, the USB presence detection circuit 113 detects a USB cable as being connected, and generates a high level signal that indicates the presence of a USB signal. If the potential of the power supply line signal is 0V, the USB presence detection circuit 113 detects a USB cable as not being connected, and generates a low level signal that indicates the absence of a USB signal.

By displaying an OSD (on screen display) display when the user preliminarily operates the button switch of the display device main body or the remote controller, the control circuit 114 causes the memory circuit 115 to memorize setting values that indicate the relationship between the video input unit 11A to which a video signal is input, and the USB terminal 15.

Figure 5:
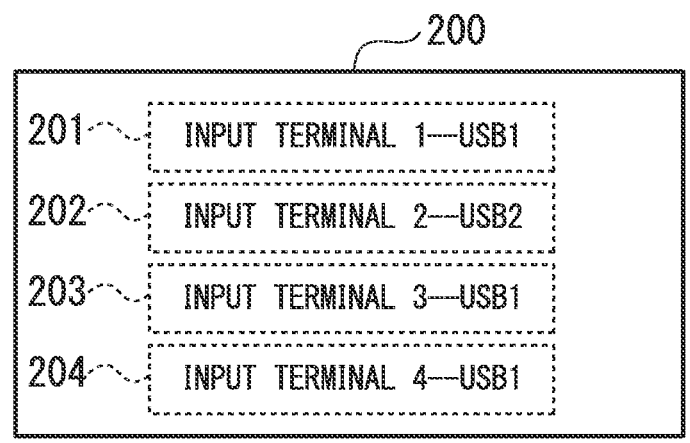
FIG. 5 is a diagram for describing an example of an OSD display according to the second exemplary embodiment.

FIG. 5 is a diagram for describing an example of an OSD display according to the present exemplary embodiment. In FIG. 5, reference symbol 200 denotes an example of an OSD display screen displayed on the video display unit 21. As shown in FIG. 5, the screen 200 includes a region 201 that shows a setting related to the input terminal 1 (video input unit 11A-1), and a region 202 that shows a setting related to the input terminal 2 (video input unit 11A-2). Moreover, the screen 200 includes a region 203 that shows a setting related to the input terminal 3 (video input unit 11A-3), and a region 204 that shows a setting related to the input terminal 4 (video input unit 11A-4). In the example shown in FIG. 5, the input terminal 1 (video input unit 11A-1) and the USB terminal 1 (USB terminal 15-1) are associated with each other, and the input terminal 2 (video input unit 11A-2) and the USB terminal 2 (USB terminal 15-2) are associated with each other. Moreover, the input terminal 3 (video input unit 11A-3) and the USB terminal 1 (USB terminal 15-1) are associated with each other, and the input terminal 4 (video input unit 11A-4) and the USB terminal 1 (USB terminal 15-1) are associated with each other.

In the example shown in FIG. 5, there are four video input units 11A, which are input terminals, and there are two USB up streams. In this case, for example, the display device 1A may include only the USB terminal 15-1 and the USB 15-2.

The control circuit 114 receives input of a video signal presence detection signal e5-1 output from the signal presence detection circuit 111, a cable presence detection signal e5-2 output from the cable connection detection circuit 112, a video switching request signal e6 output from the input switching switch 14, and a USB signal presence detection signal e7 output from the USB presence detection circuit 113. The control circuit 114 determines whether or not to switch to the video signal of the video input unit 11A that has been switched by the user, based on the following condition 1 or condition 2.

Condition 1: Video signal present
Condition 2: Video cable is connected, and USB signal of the USB terminal 15 associated with the video input unit 11A set in the memory circuit 115 is present The control circuit 114, according to the determined result, generates a video selection signal e9 for outputting, to the video processing circuit 20, the video signal switched by the video switching request signal e6 among the video signals V1 to Vn input from the video input unit 11A. The control circuit 114 outputs the generated video selection signal e9 to the video input selection circuit 12.

Moreover, the control circuit 114, according to the determined result, outputs to the USB input selection circuit 18, the USB selection signal e8 that indicates the USB signal U-s is to be output to the USB terminal 15 associated with the video input unit 11A switched by the video switching request signal e6.

For example, if the video switching request signal e6 with respect to the video input unit 11A-2 switched by the input switching switch 14 indicates a video signal being present (condition 1), the control circuit 114 switches to the video of the video input unit 11A-2 switched by the user.

On the other hand, in the case of the power saving mode of the PC 2-2, though a video signal is not detected, it is detected that a video cable is connected by the cable presence detection signal e5-2 and it is detected that a USB signal is present by the USB signal presence detection signal e7 (condition 2). As a result, even if the PC 2-2 connected to the selected video input unit 11A-2 is in the power saving mode, the control circuit 114 switches to the video of the video input unit 11A-2 that is switched by the user. Furthermore, the control circuit 114 outputs a USB signal to the PC 2-2 via the USB terminal 15-2 associated with the video input unit 11A-2.

The memory circuit 115 memorizes setting values that indicate the relationship between the video input unit 11A set by the user and the USB terminal 15.

Figure 6:
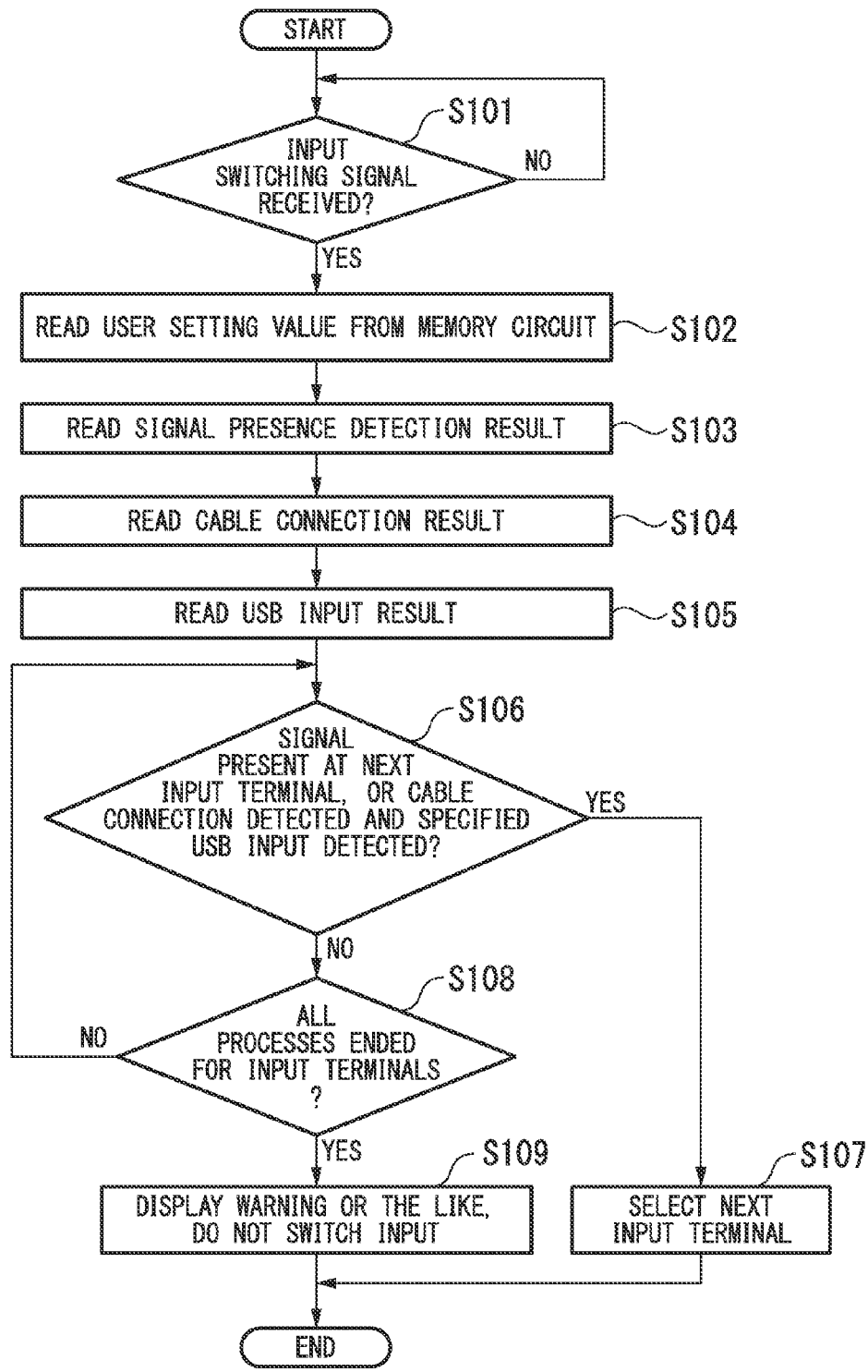
FIG. 6 is a flowchart of processing steps for video signal selection according to the second exemplary embodiment.

FIG. 6 is a flowchart of processing steps for video signal selection according to the present exemplary embodiment.

(Step S101) The control circuit 114 determines whether or not a video switching request signal e6, which is an input switching signal output from the input switching switch 14, has been detected. If a video switching request signal e6 is determined as being detected (step S101; YES), the control circuit 114 proceeds to step S2, and if a video switching request signal e6 is determined as not being detected (step S101; NO), it repeats step S101.

(Step S102) The control circuit 114 reads a setting value memorized in the memory circuit 115.

(Step S103) The control circuit 114 obtains a video signal presence detection signal e5-1 output from the signal presence detection circuit 111.

(Step S104) The control circuit 114 obtains a cable presence detection signal e5-2 output from the cable connection detection circuit 112.

(Step S105) The control circuit 114 obtains a USB signal presence detection signal e7 output from the USB presence detection circuit 113.

(Step S106) The control circuit 114 repeats the processes of step S106 through S108 on video signals of the video input units 11A-1 to 11A-n, according to an input switching request signal e6. First, the control circuit 114 determines whether a video signal presence detection signal e5-1 that associates with the next video input unit 11A in the sequence currently displayed on the video display unit 21 is present. Or, the control circuit 114 determines whether a cable presence detection signal e5-2 associated with the next video input unit 11A in the sequence is present, and whether a USB signal presence detection signal e7 of the USB terminal 15 associated with the video input unit 11A is present. The next video input unit 11A in the sequence is the video input unit 11A-2 if the video input unit 11A-1 is currently selected.

If a video signal presence detection signal e5-1 that associates with the next video input unit 11A in the sequence is determined as being present, or if a cable presence detection signal e5-2 that associates with the next video input unit 11A in the sequence is determined as being present and a USB signal presence detection signal e7 of the USB terminal 15 that associates with the video input unit 11A is determined as being present (step S106; YES), the control circuit 114 causes the process to proceed to step S107. If a video signal presence detection signal e5-1 that associates with the next video input unit 11A in the sequence is determined as being absent, and if a cable presence detection signal e5-2 that associates with the next video input unit 11A in the sequence is determined as being absent or a USB signal presence detection signal e7 of the USB terminal 15 that associates with the video input unit 11A is determined as being absent (step S106; NO), the control circuit 114 causes the process to proceed to step S108.

(Step S107) The control circuit 114 selects the next video input unit 11A in the sequence as the video input unit to be used. Next, the control circuit 114 generates a video selection signal e9 for outputting the video signal input to the next video input unit 11A in the sequence, to the video processing circuit 20, and outputs the generated video selection signal e9 to the video input selection circuit 12. Next, the control circuit 114 generates a USB selection signal e8 for outputting the USB signal U-s output from the USB terminal 17, to the USB terminal 15 that is associated with the next video input unit 11A in the sequence, and outputs the generated USB selection signal e8 to the USB input selection circuit 18. Next, the USB input selection circuit 18 outputs a USB signal U-s output from the USB terminal 17 to the USB terminal 15 associated with the next video input unit 11A in the sequence, according to the USB selection signal e8 output from the control circuit 114. As a result, the upstream and downstream, which are USB signals, are linked to the PC 2 even when the PC 2 is in the power saving mode. Accordingly, the PC 2, the mouse, and the keyboard are connected. Therefore, the PC 2 detects these signals, and automatically resumes from the power saving mode so as to output video signals to the display device 1A. Next, the video input selection circuit 12 outputs a video signal e10 of the selected video input unit 11A, to the video processing circuit 20, according to the video selection signal e9 output from the control circuit 114.

(Step S108) The control circuit 114 determines whether or not all of the processes for the video input units 11-1 through n have been ended. If all of the process up to the video input unit 11-n are determined as having been ended (step S108; YES), the control circuit 114 proceeds to step S109, and if all of the process up to the video input unit 11-*n* are determined as not having been ended (step S108; NO), it returns to step S106.

If all of the process up to the video input unit 11-*n* are determined as not having been ended, the control circuit 114 selects the video input unit 11A of the next processing target, and repeats steps S106 through S108.

(Step S109) Since the requirement is not met for switching to the input terminal other than the one that is currently displayed, the control circuit 114 generates a video selection signal e9 indicating that the video input unit 11A is not to be switched, and outputs the generated video selection signal e9 to the video input selection circuit 12. That is to say, the control circuit 114 does not perform input switching. Next, the video processing circuit 20 displays a warning on the video display unit 21 to state that input cannot be switched.

Figure 7:
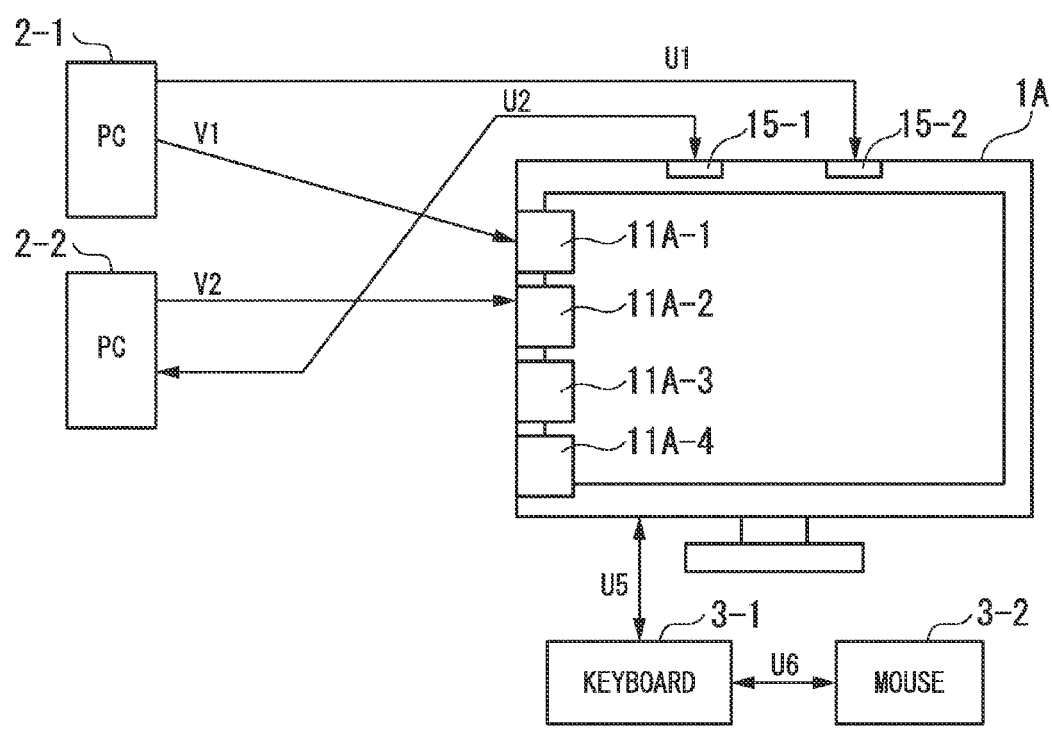
FIG. 7 is a diagram for describing connections between the display device according to the second exemplary embodiment, PCs, and USB devices.

Next, as an example, here is described, using FIG. 4 and FIG. 7, a case where two PCs 2-1 and 2-2 are connected to the display device 1A.

FIG. 7 is a diagram for describing connections between the display device 1A according to the present exemplary embodiment, PCs 2, and USB devices. As shown in FIG. 7, to the display device 1A there are connected a PC 2-1, a PC 2-2, a keyboard 3-1, and a mouse 3-2. A video signal V1 of the PC 2-1 is input to the video input unit 11A-1 via a cable. A USB signal U1 of the PC 2-1 is input to the USB terminal 15-1 via a cable.

Moreover a video signal V2 of the PC 2-2 is input to the video input unit 11A-2 via a cable. A USB signal U2 of the PC 2-2 is input to the USB terminal 15-2 via a cable. Furthermore, a USB signal U5 of the keyboard 3-1 is input to the USB terminal 17, and a USB signal U6 of the mouse 3-2 is input to the USB terminal 17 via the keyboard 3-1 that has a hub function. Moreover, it is supposed that the memory circuit 115 memorizes setting values shown in FIG. 5.

First, the video display unit 21 of the display device 1A is displaying a video image output from the video input unit 11A-1 based on the video signal V1 input from the PC 2-1. Furthermore, to the PC 2-1 there are connected a keyboard 3-1, and a mouse 3-2 via the display device 1A. In this state, the user uses the keyboard 3-1 and the mouse 3-2 to operate the PC 2-1, and video display is performed on the display device 1A.

When the user presses the input switching switch 14, the control circuit 114 reads the setting value memorized in the memory circuit 115 for the next video input unit 11A-2 in the sequence. In this case, there is memorized a setting value in which the video input unit 11A-2 and the USB terminal 15-2 are associated with each other.

Next, the control circuit 114 determines whether a video signal presence detection signal e5-1 that associates with the next video input unit 11A-2 in the sequence currently displayed on the video display unit 21 is present.

If the PC 2-2 is in the normal operating mode, the control circuit 114 determines a video signal presence detection signal e5-1 associated with the next video input unit 11A-2 in the sequence as being present, and performs video signal input switching.

If the PC 2-2 is in the power saving mode, the control circuit 114 determines a video signal presence detection signal e5-1 associated with the next video input unit 11A-2 in the sequence as being absent. Next, the control circuit 114 determines a cable presence detection signal e5-2 associated with the next video input unit 11A in the sequence is present, and a USB signal presence detection signal e7 of the USB terminal 15 associated with the video input unit 11A is present, and performs video signal input switching.

Next, according to the determination results, the control circuit 114 generates a video selection signal e9 for selecting the video input unit 11A-2, and outputs the generated video selection signal e9 to the video input selection circuit 12. Next, the control circuit 114 generates a USB selection signal e8 for outputting, to the USB terminal 15-2, the USB signal U-s output from the USB terminal 17, and outputs the generated USB selection signal e8 to the USB input selection circuit 18. Next, the USB input selection circuit 18 outputs the USB signal U-s output from the USB terminal 17, to the USB terminal 15-2, according to the USB selection signal e8 output from the control circuit 114. Next, the video input selection circuit 12 outputs a video signal e10, which is the video signal V2 output from the selected video input unit 11A-2, to the video processing circuit 20, according to the video selection signal e9 output from the control circuit 114. The video processing circuit 20 displays the signal e11 based on the video signal V2, on the video display unit 21.

After the switching is performed, the user can use the keyboard 3-1 and the mouse 3-2 to operate the PC 2-2, and video display can be performed on the display device 1A.

Next, when the user presses the input switching switch 14, the control circuit 114 reads the setting value memorized in the memory circuit 115 for the next video input unit 11A-3 in the sequence. In this case, the setting value is such that the video input unit 11A-3 and the USB 1 (USB terminal 15-1) are associated with each other as shown in FIG. 5.

Next, the control circuit 114 determines that a video signal presence detection signal e5-1 that associates with the next video input unit 11A-3 in the sequence currently displayed on the video display unit 21 is absent. Furthermore, the control circuit 114 determines that a cable presence detection signal e5-2 associated with the next video input unit 11A-3 in the sequence is absent, and a USB signal presence detection signal e7 of the USB terminal 15-1 associated with the video input unit 11A is present. Accordingly, the control circuit 114 determines that it is not possible to switch to the video input unit 11A-3. Moreover, the control circuit 114 determines that a video signal presence detection signal e5-1 associated with the next video input unit 11A-4 in the sequence is absent. Also, a cable presence detection signal e5-2 of the 11A-4 is not present and a USB presence detection signal e7 is present, and as a result, the control circuit 114 determines that it is not possible to switch to the video input unit 11A-4. On the other hand, the control circuit 114 determines that a video signal presence detection signal e5-1 associated with the next video input unit 11A-1 in the sequence is present. Moreover, a cable presence detection signal e5-2 of the 11A-1 is present and a USB presence detection signal e7 is present, and as a result, the control circuit 114 determines that it is possible to switch to the video input unit 11A-1.

Next, according to the determination results, the control circuit 114 generates a video selection signal e9 for selecting the video input unit 11A-1, and outputs the generated video selection signal e9 to the video input selection circuit 12. Next, the control circuit 114 generates a USB selection signal e8 for outputting, to the USB terminal 15-1, the USB signal U-s output from the USB terminal 17, and outputs the generated USB selection signal e8 to the USB input selection circuit 18. Next, the USB input selection circuit 18 outputs the USB signal U-s output from the USB terminal 17, to the USB terminal 15-1, according to the USB selection signal e8 output from the control circuit 114. Next, the video input selection circuit 12 outputs a video signal e10, which is the video signal V1 output from the selected video input unit 11A-1, to the video processing circuit 20, according to the video selection signal e9 output from the control circuit 114. The video processing circuit 20 displays the signal e11 based on the video signal V1 on the video display unit 21. As a result, the user can use it in the state where the PC 2-1 is connected to the display device 1A, and the keyboard 3-1 and the mouse 3-2 are connected to the PC 2-1.

In FIG. 7, there is described a case where the power supply of the PC 2-2 is in the OFF state. Here, it is supposed that the memory circuit 115 memorizes setting values shown in FIG. 5.

In this case, a video signal V2 is not input to the video input unit 11A-2. Therefore the video signal presence detection signal e5-1 for the video input unit 11A-2 indicates the video signal being absent. Moreover, since a video cable is connected, the cable presence detection signal e5-2 indicates the cable being present. The USB signal presence detection signal e7 of the USB terminal 15-2 associated with the video input unit 11A-2 indicates the USB signal being absent. Accordingly, the control circuit 114 does not perform input switching to the video input unit 11A-2.

In FIG. 7, the video signal presence detection signal corresponding to the video input unit 11A-3 indicates the video signal being absent, and since the video cable is not connected, the control circuit 114 does not perform input switching to the video input unit 11A-3. Similarly, since the control circuit 114 does not perform input switching to the video input unit 11A-4 either, it displays a warning to state that input cannot be switched, and ends the process without performing input switching.

In the present exemplary embodiment, there has been described an example in which setting information memorized in the memory circuit 115 is read in step S102. However, it is not limited to this. The setting information from the memory circuit 115 may be preliminarily read, and it is thereby possible to reduce the switching time.

Moreover, the timing of video signal detection, video cable connection detection, and USB signal detection may not only be the timing when the input switching switch 14 is pressed, but it may also be performed periodically. As a result, the amount of time for the process after the input switching switch having been pressed, is reduced. Alternatively, the control circuit 114 may read setting information only when results from the signal presence detection circuit 111, the cable connection detection circuit 112, and the USB presence detection circuit 113 change.

Furthermore, in the present exemplary embodiment, the control circuit 114 may switch the video input selection circuit 12 prior to the USB input selection circuit 18, or the USB input selection circuit 18 may be switched prior to the video input selection circuit 12.

In the first and second exemplary embodiments, there have been described cases where there are one signal presence detection circuit 111, one cable connection detection circuit 112, and one USB presence detection circuit 113. However, it is not limited to this. For example, the display device 1 (or 1A) may include a signal presence detection circuit 111 and a cable connection detection circuit 112 for each video input unit 11 (or 11A). Alternatively, the signal presence detection circuit 111 and the cable connection detection circuit 112 may detect each input terminal by switching one circuit in a chronological manner by means of selector.

Moreover, in the case where there are a number of video input units 11 (or 11A), it becomes time consuming if the above process is performed every time when the user presses the input switching switch 14. For this reason, in the display device 1 (or 1A), the switching process starts when a given length of time has elapsed since the moment when the input switching switch 14 was pressed, and the control circuit 19 (or 114) memorizes how many times the input switching switch has been pressed until the given length of time has elapsed. Then after the given length of time has elapsed since the input switching switch 14 was pressed last, the display device 1 (or 1A) selects the input terminal to the switching destination according to the counted number of times the input switching switch 14 has been pressed so far. Thereby, the display device 1 (or 1A) may send only once a control signal to be sent to the video input selection circuit 12, and as a result, it is possible to reduce the definitive length of switching time.

Moreover, an example in which there is a single USB 17 has been described in the present exemplary embodiment. However, a USB hub may be placed between the USB input selection circuit 18 and the USB terminal 17, and thereby a plurality of USB terminals may be provided in the display device. As a result, it is possible to connect the mouse 3-2 directly to the display device even if the keyboard 3-1 in FIG. 4 and FIG. 7 does not have a USB hub function.

Third Exemplary Embodiment

Figure 8:
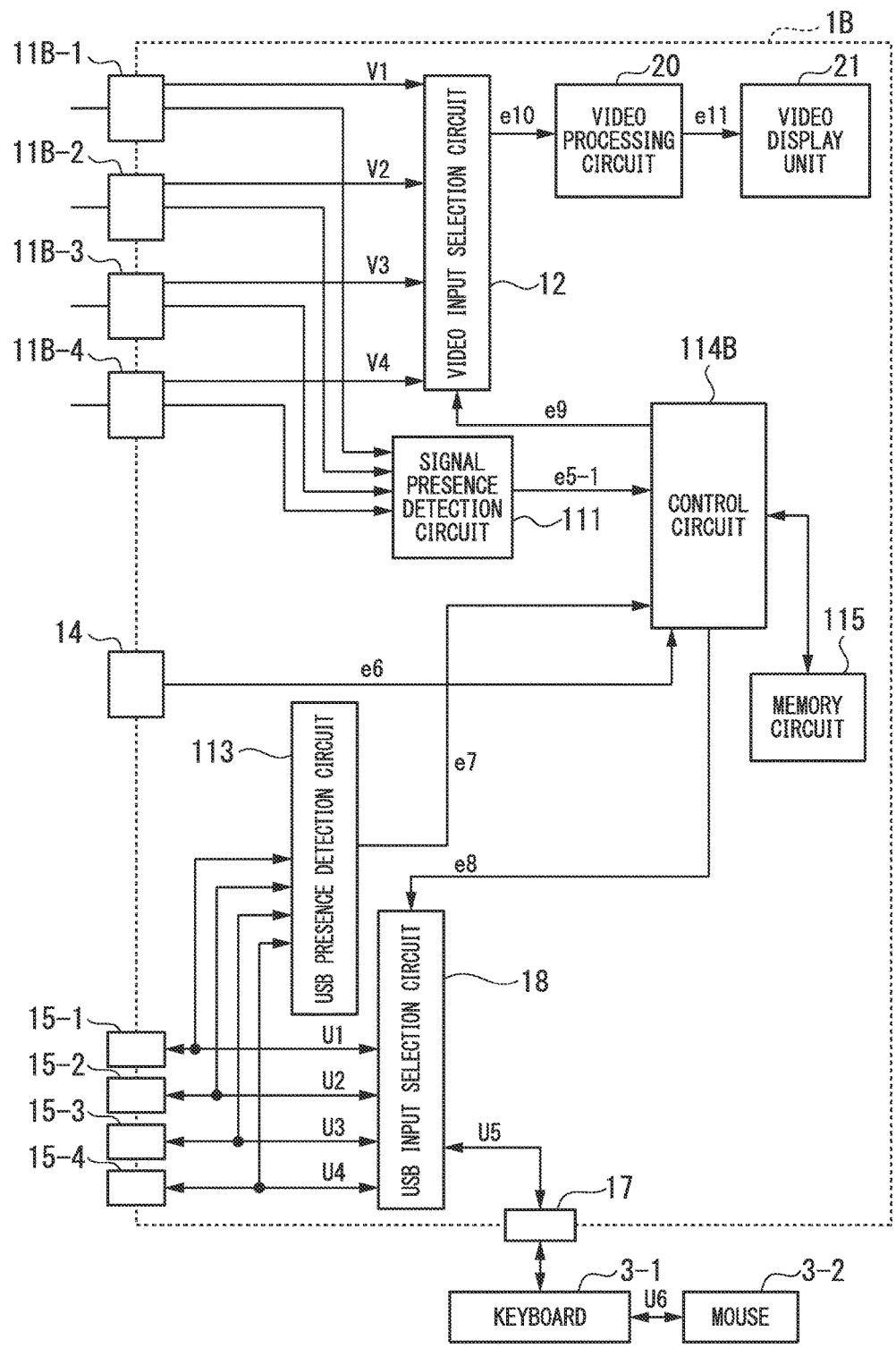
FIG. 8 is a block diagram of a schematic configuration of a display device according to a third exemplary embodiment.

FIG. 8 is a block diagram of a schematic configuration of a display device 1B according to the present exemplary embodiment. As shown in FIG. 8, the display device 1B includes four video input units 11B-1 to 11-4, a video input selection circuit 12, a signal presence detection circuit 111, an input switching switch 14, n USB terminals 15-1 to 15-4, a USB presence detection circuit 113, a USB terminal 17, a USB input selection circuit 18, a control circuit 114B, a memory circuit 115, a video processing circuit 20, and a video display unit 21. The functional units having the same functions as those of the display device 1A of the second exemplary embodiment are denoted by the same reference symbols, and descriptions thereof are omitted. As shown in FIG. 8, the display device 1B does not include a cable connection detection circuit 112, which is provided in the display device 1A.

As with the second exemplary embodiment, by displaying an OSD when the user preliminarily operates the button switch of the display device main body or the remote controller, the control circuit 114B causes the memory circuit 115 to memorize setting values that indicate the relationship between the video input unit 11B to which a video signal is input, and the USB terminal 15.

The control circuit 114B detects a video switching request signal e6 output from the input switching switch 14. The control circuit 114B outputs to the USB input selection circuit 18, a USB switching signal e8 for switching to the USB terminal 15 based on the setting value memorized in the memory circuit 115. As a result, the keyboard 3-1 and the mouse 3-2 are connected to the PC 2 selected by the input switching switch 14, and a USB signal is supplied. After outputting the USB switching signal e8, the control circuit 114B goes into standby for a predetermined length time. Here, the predetermined length of time is a time that is not less than the length of time required for resuming to the normal operating mode upon a USB signal input in the case where the PC 2 is in the power saving mode. After the predetermined length of time has elapsed, the control circuit 114B obtains a video signal presence detection signal e5-1 output from the signal presence detection circuit 111. In the case where the video signal presence detection signal e5-1 associated with the video input unit 11B selected by the input switching switch 14 indicates a video signal being present, the control circuit 114B switches the input so as to display the video signal of the video input unit 11B. On the other hand, in the case where the video signal presence detection signal e5-1 associated with the video input unit 11B selected by the input switching switch 14 indicates a video signal being absent, the control circuit 114B does not switch the input, so as to display the video signal of the video input unit 11B, and detects whether it is possible to switched to the next input signal. Thereafter, as with the first and second exemplary embodiments, all inputs are confirmed sequentially, and switching is performed if the switching condition is met. If the switching condition is not met, then a warning is displayed to state that switching cannot be performed for example, and the process is ended without performing input switching.

As described above, the display device 1B of the present exemplary embodiment resumes the PC 2 from the power saving mode to the normal operating mode even if the PC 2 is in the power saving mode, by making an input of a USB signal first to the PC 2 from the USB terminal 15. Then in the present exemplary embodiment, after resuming to the normal operating mode, input switching can be performed by determining whether or not the video signal input to the display device 1B from the PC 2 is being input.

Moreover, an example in which there is a single USB 17 has been described in the present exemplary embodiment. However, a USB hub may be placed between the USB input selection circuit 18 and the USB terminal 17, and thereby a plurality of USB terminals may be provided in the display device. As a result, it is possible to connect the mouse 3-2 directly to the display device even if the keyboard 3-1 in FIG. 8 does not have a USB hub function.

In the first through third exemplary embodiments, there have been described examples in which setting values are set by the input switching switch 14 provided in the display device 1 (or 1A, 1B). However, it is not limited to this. The display device 1 (or 1A, 1B) may have, for example, a receiver unit for the remote controller, and the user may operate this remote controller to perform setting. Alternatively, the input switching switch 14 is not limited to a physical switch, and it may use other means that have not been described, such as command operations by means of a communication line (not shown in the figure) such as DDC/CI (display data channel command interface) interface and RS232C interface.

In the first through third exemplary embodiments, there have been described examples of using a USB as a connection with the PC 2. However, it is not limited to this. There may be used another interface provided this is an interface for connecting a PC and input devices such as a keyboard and mouse.

A program for realizing the functions of the respective circuits of FIG. 1, the respective circuits of FIG. 4, and the respective circuits of FIG. 8 in the exemplary embodiments may be recorded on a computer-readable recording medium, and this program recorded on the recording medium may be loaded and executed on a computer system to thereby perform the process of each unit. The "computer system" here includes an OS as well as hardware such as peripheral devices.

Moreover, the "computer system" here includes a homepage provision environment (or display environment) if a WWW system is used.

Furthermore, the "computer-readable recording medium" here refers to a portable medium such as a flexible disk, a magnetic optical disk, a ROM (read-only memory), and a CD-ROM, or a memory device such as a USB memory connected via a USB I/F (interface), and a built-in hard disk of a computer system. Furthermore, the "computer-readable recording medium" here includes one that retains a program for a given length of time such as a volatile memory inside a computer system serving as a server and client. Moreover, the above program may be for realizing part of the functions described above, and further, the functions described above may be realized in combination with a program that is preliminarily recorded on a computer system.

REFERENCE SYMBOLS 1, 1A, 1B Display device
11-1 to 11-$n$, 11A-1 to 11A-n, 11B-1 to 11B-n Video input unit to video input unit
12, 12A, 12B Video input selection circuit
13 Second detection circuit
14 Input switching switch
15-1 to 15-$n$, 16 First detection circuit
17 USB terminal
18 USB input selection circuit
19, 114, 114B Control circuit
20 Video processing circuit
21 Video display unit
111 Signal presence detection circuit
112 Cable connection detection circuit
113 USB presence detection circuit
115 Memory circuit

The invention claimed is:

1. A display device, comprising:
a plurality of input units that include first and second input units, the first input unit being connected with a first external device and receiving a first video signal from the first external device, the second input unit being connected with a second external device and receiving a second video signal from the second external device;
a plurality of connection units that include first and second connection units, the first connection unit being connected with the first external device, the second connection unit being connected with the second external device, the second connection unit receiving a universal serial bus (USB) signal from the second external device, the USB signal being different from the second video signal, the second connection unit receiving a signal from a first device different from the first and second external devices, the second connection unit transmitting, to the second external device, the signal received from the first device;
a first detection unit that detects the USB signal from the second external device via the second connection unit, the first detection unit outputting a first detection result indicating presence or absence of the USB signal;
a second detection unit that detects the second video signal from the second external device via the second input unit, the second detection unit outputting a second detection result indicating presence or absence of the second video signal; and
a control unit that determines that the second external device is connected with the second connection unit in a case where the first detection result indicates presence of the USB signal, the control unit determining that the second external device is connected with the second input unit in a case where the second detection result indicates presence of the second video signal, the control unit performing control so that a video signal to be supplied to a display unit is switched from the first video signal to the second video signal to cause the display unit to display an image based on the second video signal in a case where the control unit determines that the second external device is connected with at least one of the second connection unit and the second input unit, the control unit performing control so that the video signal to be supplied to the display unit is switched from the first video signal to the second video signal, and the second connection unit sends, to the second external device, the signal received from the first device to cause the second external device to start outputting the second video signal in a case where the first detection result indicates presence of the USB signal and the second detection result indicates absence of the second video signal.

2. The display device according to claim 1, wherein the control unit performs control, based on a relationship between a predetermined single input unit among the plurality of input units and a predetermined single connection unit among the plurality of connection units, so that a video signal output from an external device connected to the predetermined single input unit is supplied to the display unit.

3. The display device according to claim 1, wherein the control unit causes a signal to be supplied to the second external device via the second connection unit, and then the control unit obtains the second detection result after a predetermined length of time has elapsed.

4. The display device according to claim 1, further comprising:
a switching unit that outputs a switching signal,
wherein the control unit performs the control according to the switching signal.

5. The display device according to claim 1, wherein the first input unit is different from the first connection unit, and the second input unit is different from the second connection unit.

6. The display device according to claim 1, wherein the signal received from the first device includes a USB signal.

7. The display device according to claim 1, wherein the second connection unit includes a USB terminal.

8. The display device according to claim 1, wherein the first connection unit receives a USB signal from the first external device.

9. The display device according to claim 1, wherein the first connection unit receives a USB signal from the first device and transmits the USB signal that is received by the first connection unit to the first external device.

10. The display device according to claim 1, wherein the control unit determines that the second external device is connected with the second connection unit and the second input unit in a case where the first detection result indicates presence of the USB signal and the second detection result indicates presence of the second video signal,
wherein the control unit determines that the second external device is connected with the second connection unit in a case where the first detection result indicates presence of the USB signal and the second detection result indicates absence of the second video signal,
wherein the control unit determines that the second external device is connected with the second input unit in a case where the first detection result indicates absence of the USB signal and the second detection result indicates presence of the second video signal, and
wherein the control unit determines that the second external device is not connected with the second connection unit and the second input unit in a case where the first detection result indicates absence of the USB signal and the second detection result indicates absence of the second video signal.

11. The display device according to claim 1, wherein the first external device includes a computer,
wherein the second external device includes a computer, and
wherein the first device includes a USB device.

12. The display device according to claim 1, wherein the second connection unit sends, to the second external device, the signal received from the first device to cause the second external device to resume from a power saving mode and to cause the second external device to start outputting the second video signal.

13. A display method for a display device, the display device including first and second input units and first and second connection units, the first input unit being connected with a first external device, the second input unit being connected with a second external device, the first connection unit being connected with the first external device, the second connection unit being connected with the second external device, the method comprising:
receiving, by the first input unit, a first video signal from the first external device;
receiving, by the second input unit, a second video signal from the second external device;
receiving, by the second connection unit, a universal serial bus (USB) signal from the second external device, the USB signal being different from the second video signal;
receiving, by the second connection unit, a signal from a first device different from the first and second external devices;
transmitting, by the second connection unit, to the second external device, the signal received from the first device;
detecting the USB signal from the second external device via the second connection unit;
outputting a first detection result indicating presence or absence of the USB signal;
detecting the second video signal from the second external device via the second input unit;
outputting a second detection result indicating presence or absence of the second video signal;
determining that the second external device is connected with the second connection unit in a case where the first detection result indicates presence of the USB signal;
determining that the second external device is connected with the second input unit in a case where the second detection result indicates presence of the second video signal;
performing control so that a video signal to be supplied to a display unit is switched from the first video signal to the second video signal to cause the display unit to display an image based on the second video signal in a case where it is determined that the second external device is connected with at least one of the second connection unit and the second input unit; and
performing control so that a video signal to be supplied to the display unit is switched from the first video signal to the second video signal, and the second connection unit sends, to the second external device, the signal received from the first device to cause the second external device to start outputting the second video signal in a case where the first detection result indicates presence of the USB signal and the second detection result indicates absence of the second video signal.

14. The display method according to claim 13, wherein the control unit performs the control according to the switching signal output from a switching unit.

15. The display method according to claim 13, wherein the first input unit is different from the first connection unit, and the second input unit is different from the second connection unit.

16. The display method according to claim 13, wherein the signal received from the first device includes a USB signal.

17. The display method according to claim 13, wherein the second connection unit includes a USB terminal.

18. The display method according to claim 13, wherein the first connection unit receives a USB signal from the first external device.

19. The display method according to claim 13, wherein the first connection unit receives a USB signal from the first device and transmits the USB signal that is received by the first connection unit to the first external device.

* * * * *